United States Patent [19]

Rindtorff

[11] Patent Number: 5,751,850

[45] Date of Patent: May 12, 1998

[54] METHOD FOR IMAGE SEGMENTATION AND CLASSIFICATION OF IMAGE ELEMENTS FOR DOCUMENTS PROCESSING

[75] Inventor: Klaus Rindtorff, Wei im Schoenbuch, Germany

[73] Assignee: International Business Machines Corporation, Armonk, N.Y.

[21] Appl. No.: 726,887

[22] Filed: Oct. 4, 1996

Related U.S. Application Data

[63] Continuation of Ser. No. 263,326, Jun. 21, 1994, abandoned.

[30] Foreign Application Priority Data

Jun. 30, 1993 [EP] European Pat. Off. ............ 93110476

[51] Int. Cl.[6] ............... G06K 9/34; G06K 9/62; G06K 9/46; G06K 9/66
[52] U.S. Cl. ............... 382/178; 382/179; 382/228; 382/159; 382/194; 382/195
[58] Field of Search ............... 382/173, 178, 382/179, 224, 225, 228, 156, 159, 190-195, 180, 284; 395/21; 364/274.9

[56] References Cited

U.S. PATENT DOCUMENTS

| 4,769,849 | 9/1988 | Alsing | 382/9 |
|---|---|---|---|
| 4,888,812 | 12/1989 | Dinan et al. | 382/7 |
| 4,933,977 | 6/1990 | Ohnishi et al. | 382/178 |
| 5,005,946 | 4/1991 | Brandstetter | 350/162.12 |
| 5,046,114 | 9/1991 | Zobel | 382/178 |
| 5,073,953 | 12/1991 | Westdijk | 382/180 |
| 5,105,468 | 4/1992 | Guyon et al. | 382/14 |
| 5,138,668 | 8/1992 | Abe | 382/177 |
| 5,245,672 | 9/1993 | Wilson et al. | 382/155 |
| 5,251,265 | 10/1993 | Dohle et al. | 382/3 |
| 5,267,328 | 11/1993 | Gouge | 382/192 |
| 5,272,766 | 12/1993 | Higgins et al. | 382/30 |
| 5,321,768 | 6/1994 | Fenrich et al. | 382/178 |
| 5,337,370 | 8/1994 | Gilles et al. | 382/14 |
| 5,396,565 | 3/1995 | Asogawa | 382/199 |
| 5,434,927 | 7/1995 | Borady et al. | 382/104 |
| 5,442,715 | 8/1995 | Gaborski et al. | 382/187 |
| 5,535,287 | 7/1996 | Niki | 382/178 |

FOREIGN PATENT DOCUMENTS

| 6001928 | 1/1985 | European Pat. Off. | G06K 9/46 |
|---|---|---|---|
| 6018188 | 9/1985 | European Pat. Off. | G06K 9/46 |
| 6119327 | 8/1986 | European Pat. Off. | G06K 9/34 |
| 6227448 | 11/1987 | European Pat. Off. | G06K 9/40 |
| 6322958 | 9/1988 | European Pat. Off. | G06K 9/00 |
| 1065679 | 10/1989 | European Pat. Off. | G06K 9/62 |
| 2017588 | 1/1990 | European Pat. Off. | G06K 9/46 |
| 3282985 | 12/1991 | European Pat. Off. | G06K 9/40 |
| 8802157 | 3/1988 | WIPO | G06K 9/46 |

OTHER PUBLICATIONS

An article from the "Handbook of Pattern Recognition and Image Processing" by T. Y. Young and K. -S. Fu, 1986, Academic Press, San Diego, US. C. Y. Suen, Chapter 23, Character Recognition by Computer and Applications, pp. 569–586.

*Primary Examiner*—Bipin Shalwala
*Attorney, Agent, or Firm*—K. O. Hesse; A. P. Tennent; K. A. Seaman

[57] ABSTRACT

A method to segment, classify and clean an image is presented. It may be used in applications which have image data as their input that contains different classes of elements. The method will find, separate and classify those elements. Only significant elements must be kept for further processing and thus the amount of processed data may be significantly reduced.

14 Claims, 3 Drawing Sheets

FIG. 1
```
11
↓
0 0 0 0 0 0 0 0 0 0  ← 12
0 0 0 0 0 0 0 0 0 0
0 0 0 1 4 4 4 4 1 0 0   ← 13
0 0 3 3 4 0 0 3 3 1 0
0 0 3 4 0 0 0 0 4 3 0
                        ← 10
1 3 4 0 0 0 1 4 4 1
1 5 5 5 5 5 5 5 4 1 0
1 4 5 4 5 5 5 5 0 0 0
0 4 4 1 0 0 0 0 0 0   ← 14
0 1 3 4 1 0 0 0 2 1
0 0 0 3 4 3 3 3 0 0
0 0 0 1 3 4 5 4 0 0 0
0 0 0 0 1 1 1 0 0 0
0 0 0 0 0 0 0 0 0 0
```
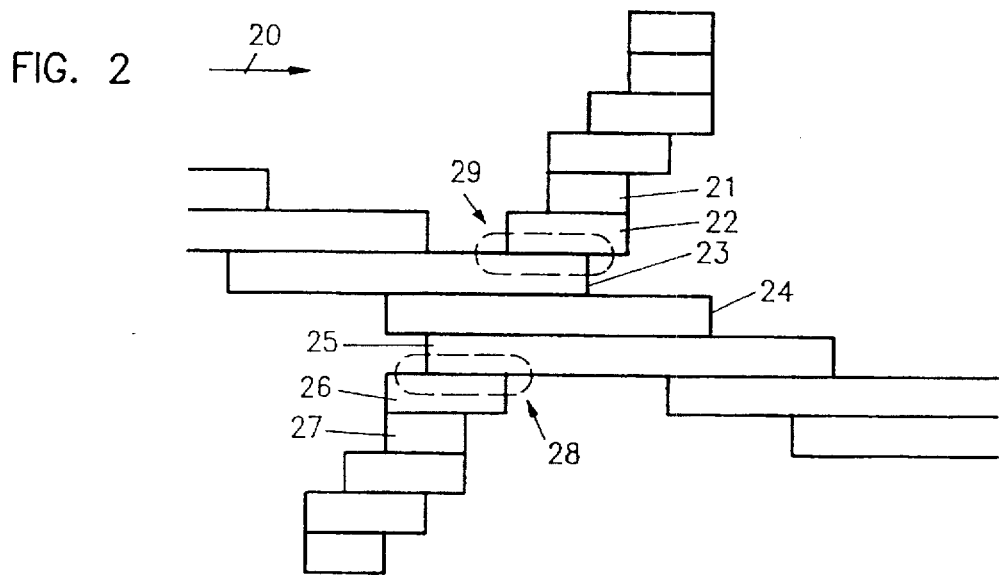
FIG. 2
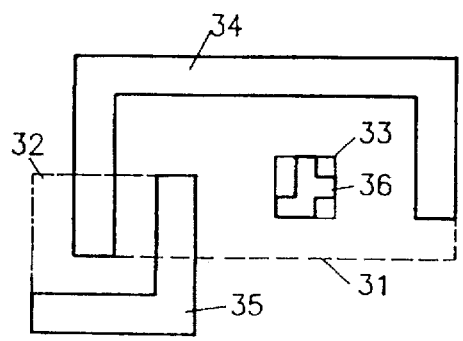
FIG. 3

METHOD FOR IMAGE SEGMENTATION AND CLASSIFICATION OF IMAGE ELEMENTS FOR DOCUMENTS PROCESSING

The application is a continuation, of application Ser. No. 08/263,326, filed Jun. 21, 1994 now abandoned.

The invention pertains to a method for image segmentation and classification of image elements for document processing, especially for removing unwanted information like e. g. form elements, lines or printed characters or the like, from documents prior to character recognition of written information, especially prior to analyzing and recognizing a signature.

BACKGROUND OF THE INVENTION
State of the Art

For the processing of images, a picture is usually captured using a camera or a scanner. The resulting image is stored as a two dimensional array of individual pixels, each representing the intensity of the image at that specific location.

In most cases there will be unwanted information in the resulting image. Dirt and unwanted background information may be reduced by manipulating the capture process. If the unwanted information falls into a different frequency band than the significant information, it may simply be filtered out during capturing.

The image quality after the capture process may still be not good enough. There exist several ways to filter the image information, like the median filter, the high-pass and the low-pass filter or the Laplace operator. Those solutions are able to significantly enhance the image quality but are very time consuming.

In the case of pattern recognition applications, the image quality is defined by the requirements for a good contrast between background and foreground. For example, a black and white image used for a typical character recognition application should consist of a white background and black characters in the foreground. Unwanted information like lines, drawings, stamps, and other parts from the captured image which are not input to the recognition process must be removed. This can not be done by a filter operation like those described before.

Other pattern recognition processes, like signature verification or handwriting recognition, also need a well defined input. They are typically based on the extraction of feature values from the image and because of that unwanted image information will hinder the recognition process. An example for a technique based on the extraction and comparison of significant features is given in IBM's published patent application EP-A-O 483 339, concerning an automatic signature verification, which is specifically incorporated herein by reference in its entirety.

There is another problem area for the image or pattern recognition applications named above. If the typical image contents and element locations are known before capturing, the desired information may be separated using the information about their location. If multiple classes of image contents exist, the correct class must be recognized first. In the case of document processing, for example, the character information may be extracted from the image if the position is defined. For that, the type of the document must first be known or recognized using appropriate techniques.

It is the object of the present invention to overcome the draw-backs of the known processes mentioned above, and it is especially the object of the present invention to provide a method by which in a flexible, versatile, and secure manner an image of a document can be separated in image elements, image elements can be located and classified so that unwanted image elements within the scanned document can be removed prior to the recognition process.

In accordance with the present invention, these and other objects are basically solved by applying the steps laid down in independent claim 1. Further advantageous embodiments of the basic solution given in claim 1 are laid down in the dependent claims. The advantages are either self-explaining or laid down and explained later-on in the specific description.

The method of the present invention is able to locate and classify image elements. It does this basically in four steps. The first step is the image element segmentation. During this step, image elements are searched and stored for further processing. The second step is the extraction of feature information from the image elements. The third step is the classification of each of the image elements from the first step based on the feature information from the second step. The fourth step is the removal of those elements which are classified as unwanted information.

In the following, the invention will be described in more detail in connection with an example shown in the drawing, in which:

FIG. 1 shows an intensity pixel matrix of the small character "e";

FIG. 2 shows schematically a scheme to detect image elements connections said are of a too small value;

FIG. 3 shows schematically an example for rectangular image areas which penetrate each other;

Figure 4:
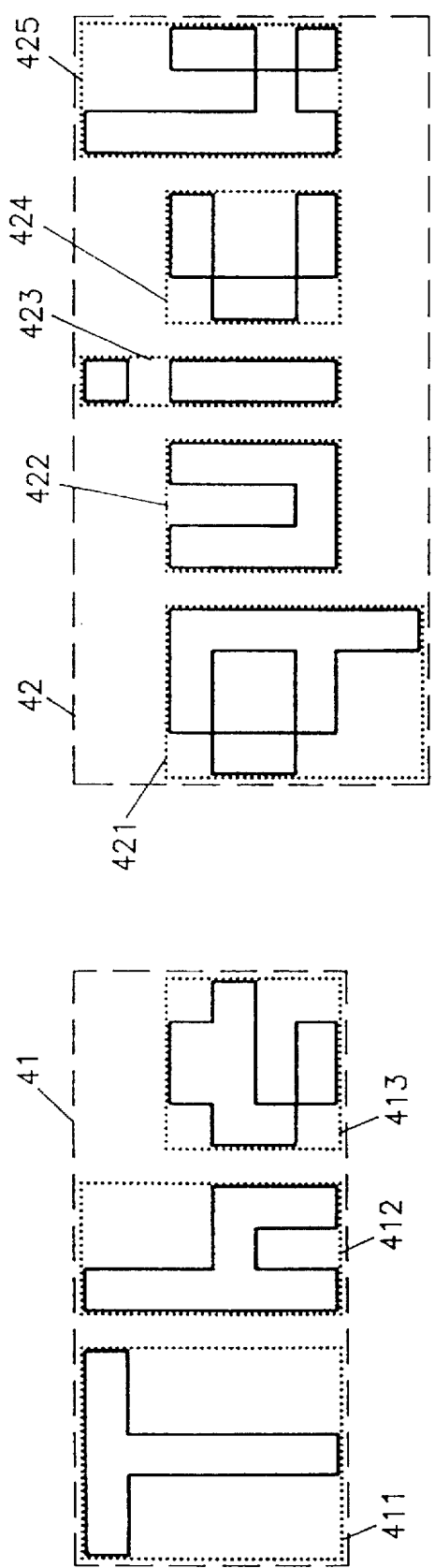
FIG. 4 shows a typical example for the image elements found in a typical line of text.

In the following, the method of the present invention encompassing basically four steps will be described in detail in connection with the FIGS. 1 to 5.

Document processing techniques are discussed in (1) U.S. Pat. No. 4,888,812 entitled "Document Image Processing System"; and (2) "Structured Document Image Analysis", by H. S. Baird, H. 0. Bunke, and K. Yamamoto, ISBN 3-540-55141-7, IAPR Workshop on Syntactic and Structural Pattern Recognition, Murray Hill, N.J. (1990), which are specifically incorporated herein by reference in their entirety.

Segmentation

During the first step, the pixel array is scanned in horizontal and vertical direction. Each pixel in the array is checked and groups of neighbored pixels are searched which belong to a single image element.

An image element consists of several pixels which have the same or nearly the same intensity and have common borders. The borders are given by horizontal, vertical or diagonal neighborhood. The required conformity of the intensity value may depend on a static threshold or on a dynamic threshold value calculated from the intensity information in the near neighborhood of each pixel. In FIG. 1 there is depicted a typical image element from an image found during this process. The image shown in FIG. 1 is the intensity matrix of the small character "e". This small "e" is indicated by the reference number 10. The pixel intensity values are given in several columns in the direction of arrow 11 and several rows indicated by the arrow 12. The intensity values are indicated by the numbers 0, 1, 2, 3, 4 and 5. As threshold value for the intensity which still belongs to the character "e" 10, the value 2 is chosen as indicated in the area 14. All the values higher than 2 are encompassed by line 13 thus showing the outer circumference of the character "e" 10.

The elements found during this phase may still consist of several logical parts which have to be separated. The connections for those parts must be found and removed. In case of a line, the preferred direction, i. e. the direction along the line can be used. If there is an abrupt change of this direction, the connection between neighbored pixels are removed and thus the line is broken into several image elements.

Besides the way of finding and following each line of the image, the number of connected pixel may be used also. For that, the image is scanned in parallel runs and the length of the borders between the pixels of two such runs is calculated. This length is compared against the length from the previous and next runs in that image. If it is below a specific threshold, the connection between the pixels is cut. FIG. 2 shows an example for the decomposition into pixel runs. The image element shown in FIG. 2 is decomposed in runs along the direction of arrow 20. Indicated is a run 21, a run 22, run 23 and a run 24. The connection between the runs 22 and 23 is indicated by dotted line and pointed to by arrow 29. Here, the connection between run 22 and 23 is too short compared to the length between run 21 and 22 and run 23 and 24. Furthermore, is indicated a similar connection indicated by dotted line and pointed to by arrow 28 in a further run 25, 26 and 27. So the connection there between run 25 and 26 in comparison to the run before and the run after it is calculated as being too short. Therefore, at the indicated areas 28 and 29 the pixel connection is cut. In summary, the locations where the pixel connection is not sufficient to make up a single image element are marked by arrows 28 and 29.

A combination of both conditions described above is used to find the pixel groups which make a single image element. A required minimum size may be used to select only those image elements which are big enough to carry any significant information and to discard the others immediately. This will omit the background noise in the image and keep the number of image elements low. The position of each image element found during this process is stored for further processing.

Feature Extraction

For each of the image elements a set of feature values is calculated. Most of them are calculated immediately during the segmentation process. This is especially advantageous and in some cases also important because two different image elements may have intersecting surrounding areas. If those areas are used during the feature calculation, the parts from one image element may disturb the feature values of the other. For simplicity, rectangular areas are used as surrounding image element areas. In FIG. 3 there is shown an example for those rectangular surrounding areas 31, 32, 33 of three image elements 34, 35 and 36. Elements 34 and 35 have an intersection of their surrounding areas 31 and 32. Element 36 with its surrounding area 33 lies completely inside the surrounding area 31 of element 34.

There are two feature classes, the local and the neighborhood features. Local features describe properties of the image element itself. Neighborhood features describe the relationship between the image element and its neighboring image elements.

Local Features

One of the local features is the density feature. It is calculated as the ratio between the number of foreground pixels and the number of background pixels in an rectangular area described by the maximum horizontal and vertical extensions of the image element. It will be considerably high in case of vertical or horizontal straight lines. A further local feature is the complexity feature. It is calculated in vertical and horizontal direction, and is given by the average number of changes between high and low intensities for the specific direction. It describes the number of line parts which belong to the image element. As still further local feature the aspect ratio feature can be calculated from the quotient of the width and height of the envelope of an image element. There might exist more local features than explained here.

Neighborhood Features

The number of neighbored image elements in a specific direction can be used as a feature value also. If combined with a condition which counts only those image elements with nearly the same size properties, it makes up a good indicator for printed text. More neighborhood features might exist. FIG. 4 shows an example for the image elements found in a typical line of text. The example shown in FIG. 4 shows two larger rectangular areas 41 and 42 each surrounding a single word. Within those areas each character has its own surrounding area. So in the word "the" 41 there are the internal area 411 for the "t", the internal area 412 for the "h" and the internal area 413 for the "e". In the same way the word "quick" in the area 42 has five internal areas of rectangular shape 421, 422, 423, 424 and 425 each for the respective characters "q", "u", "i", "c" and "k".

Finally, each local feature may have an neighborhood feature equivalent. For that the average of the local feature values is calculated from each image element inside a region given by a fixed radius. The feature values are weighted by their specific distances.

Classification The classification of image elements is based on the calculated feature sets. For that, an artificial neural net approach can be used. If only the image elements which belong to one class must be found, a simple feed-forward net with a single output node will suffice. The feature values of each image element are fed into the neural net. There they are weighted internally and an output is calculated which gives a value to be interpreted as the probability whether the image element for that feature set does belong to the specific class. A well trained neural net will be able to classify not only image elements used during training but also those which are presented the first time at all. Using a state-of-the-art artificial neural network, like a multi-layer feed forward net, extremely good recognition rates have been achieved.

Neural network techniques are discussed in (1) "Neural Computing", by P. D. Wasserman, ISBN 0-442-20743-3, Van Nostrand Reinhold, N.Y. (1989); and (2) "Introduction to Neural Networks", by J. Stanley, California Scientific Software (1988), which are specifically incorporated herein by reference in their entirety.

Other network architectures with multiple outputs may be used to calculate a probability value for each image element class presented during the training process. The class membership is stored together with the image element and used during further processing. Recognized classes are, for instance, document parts like lines, stamps, signatures, handwritten or printed text.

Classification Feedback

At this point a feedback loop may be incorporated. If the probability of a specific class membership is known for each image element, this value may be used as an additional feature. For that the average of the probability values for a specific class is calculated from each image element inside a region given by a fixed radius. These features are also fed into the used neural net and improve the recognition rate significantly. The classification step may incorporate several repetitions of the above described steps until a stable result is achieved.

The resulting image elements may be grouped together again after this or the previous step. This combination will be done based on information about their size, position or their features. The group of corresponding image elements is called an image cluster. FIG. 4 shows an example for a number of image elements 411, 412, 413; 421, 422, 423, 424, 425 and their corresponding cluster 41, 42.

Cleaning

Figure 5A:
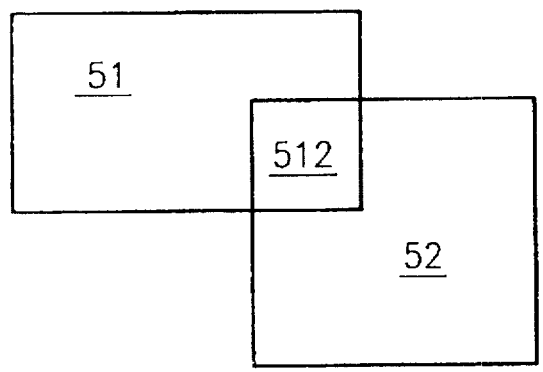
FIGS. 5A and B show intersecting rectangles and their recording.
Figure 5B:
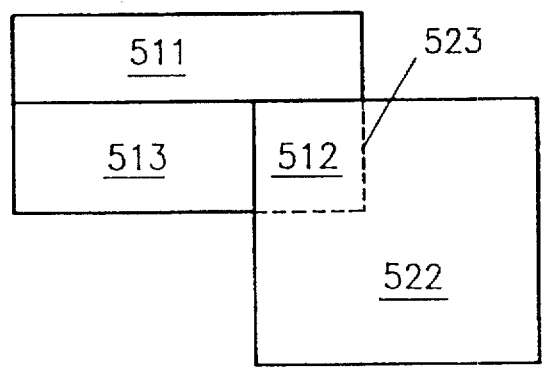

The final step consists of the removal of those image elements with an undesired class membership. One image element may completely be enclosed by another image element or two different image elements may have an intersection in their surrounding areas like those shown in FIG. 3. Because of that, all image elements to be removed are checked for intersections with other image elements which will not be removed. Each pair of image elements with intersection between their surrounding area, are replaced by a number of new image elements. The sum of those image elements make up the original image element pair but the new elements do not have any intersections in their surrounding areas. The intersection area itself will remain part of one of both image elements. In FIGS. 5a and 5b, an example of this process is shown. FIG. 5a shows a rectangular 51 and another rectangular 52 which has an intersection 512. The rectangular 51 is divided into two rectangulars 511 and 513 as shown in FIG. 5b. The intersecting area 512 is added to the rectangular 522 and no more part of the previous rectangular 51. This is indicated by the dotted line 523 surrounding the area 512 within rectangular 522 in FIG. 5b. During their creation, the new image elements 511, 513 and 522 inherit the classification of their origins. After repetition of this process for all intersections found, the resulting set of image elements can be searched and all undesired image elements can be removed.

Applications

The method of the invention as described above may be used for segmenting an image into a number of well defined image elements. Discarding small elements during this process can be used to remove background noise from an image.

Based on information about the image element size, simple form elements like vertical or horizontal lines can be found. This information can be used to recognize the underlying document type and to remove the lines before extracting other parts from the document.

The feature based classification can be used to calculate information about the image content like number and class of image elements. This can be used to classify all parts of an image and the whole image itself. An application may use this method to automatically distinguish between printed matter, handwriting, drawings or complex images like photographs.

The classified image elements may be extracted for further processing like optical character recognition or handwriting recognition. Because their position is known, less information about the underlying document structure is necessary.

An automated signature verification system may use this method to find and extract one or more signatures from a document image. The clustering is used to separate the image elements of each signature.

Of course, many modifications and adaptations to the present invention could be made to advantage without departing from the spirit of this invention. Further some features of the present invention could be used without corresponding use of other features. Accordingly, this description should be considered as merely illustrative of the principles of the present invention and not in limitation thereof.

I claim:

1. Method for removing unwanted information, lines or printed characters from documents prior to character recognition of written information, comprising the steps of:

1) segmentation of an image into image elements;
      searching each image element to determine if it comprises more than one image element by scanning a pixel array in a horizontal and a vertical direction, and identifying a common border between two parallel pixel runs, said common border having a length below a threshold value;
      cutting a connection between said two parallel runs at said common border to break an image element having said common border into several image elements;

2) extraction of feature information from each image element;

3) classification of each of the image elements;

4) removal of those image elements which are classified as unwanted information, lines and printed characters; and 5) processing remaining image elements for writing recognition.

2. Method as in claim 1, wherein those image elements that are below a required minimum size are discarded, in step 1.

3. Method as in claim 1, wherein said feature extraction from each image element is performed during the segmentation process.

4. Method as in claim 3, wherein neighborhood and local features are calculated, said neighborhood feature values describing the relationship between the single image element and its neighboring image elements, said local feature values describing properties of the image element itself.

5. Method as in claim 4, wherein as a neighborhood feature value the number of neighbored image elements in a specific direction is calculated in combination with counts of only those image elements having nearly the same size properties.

6. Method as in claim 4, wherein as local feature value there is calculated a density feature being the ratio between the number of foreground pixels and the number of background pixels in a rectangular area described by the maximum horizontal and vertical extensions of the image element.

7. Method as in claim 4, wherein each local feature value has a corresponding neighborhood feature value equivalent, said equivalent being calculated as the average of the local feature values from each image element inside a region given by a fixed radius, said calculated feature values being weighted by their specific distances.

8. Method as in claim 1, wherein in said classification step the feature values of each image element are fed into an artificial neural net, weighted internally, and an output is calculated giving a value indicative of the probability of whether the image element for that feature set does belong to a specific class.

9. Method as in claim 1, wherein in said classification step, calculating for each image element using an artificial neural network having multiple outputs, probability values for each image element class presented to said neural network during training of said neural network, and said probability values of the class membership of each image element is stored together with the image element for further processing, whereby recognized and stored classes are document parts.

10. Method as in claim 8, wherein said classification step is repeated until a stable result is achieved.

11. Method as in claim 8, wherein a feedback is incorporated by using a known probability value of a specific class membership for each image element as an additional feature value, by calculating the average value of the probability values for a specific class from each image element inside a region given by a fixed radius, these feature values also feeding into said neural network.

12. Method as in claim 8, wherein classified image elements are grouped together into clusters of corresponding image elements, said grouping being based on information regarding size, position or associated features values.

13. Method as in claim 1, wherein before removing unwanted image elements, those elements are checked for intersections with other image elements not to be removed.

14. Method as in claim 13, wherein a pair of intersecting image elements is replaced by a number of new image elements having no intersection, and the intersecting area itself is made part of one of the pair of original image elements.

* * * * *